United States Patent
Ise

(10) Patent No.: US 9,868,413 B2
(45) Date of Patent: Jan. 16, 2018

(54) FABRIC FOR AN AIR BAG THAT MAINTAINS AIR PERMEABILITY DURING HIGH-PRESSURE DEPLOYMENT AT HIGH SPEED

(71) Applicant: ASAHI KASEI FIBERS CORPORATION, Osaka-shi, Osaka (JP)

(72) Inventor: Fumiaki Ise, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 16 days.

(21) Appl. No.: 14/652,032

(22) PCT Filed: Dec. 17, 2013

(86) PCT No.: PCT/JP2013/083761
§ 371 (c)(1),
(2) Date: Jun. 12, 2015

(87) PCT Pub. No.: WO2014/098083
PCT Pub. Date: Jun. 26, 2014

(65) Prior Publication Data
US 2015/0329998 A1 Nov. 19, 2015

(30) Foreign Application Priority Data
Dec. 17, 2012 (JP) ................... 2012-274767

(51) Int. Cl.
*B60R 21/235* (2006.01)
*D03D 47/32* (2006.01)
(Continued)

(52) U.S. Cl.
CPC ............. *B60R 21/235* (2013.01); *D03D 1/02* (2013.01); *D03D 15/00* (2013.01);
(Continued)

(58) Field of Classification Search
CPC . B63B 13/00; B63B 2021/504; B63B 21/502; B32J 2/12; F15D 1/10;
(Continued)

(56) References Cited

U.S. PATENT DOCUMENTS

| | | | |
|---|---|---|---|
| 5,296,278 | A | 3/1994 | Nishimura et al. |
| 5,356,680 | A | 10/1994 | Krummheuer et al. |

(Continued)

FOREIGN PATENT DOCUMENTS

| | | |
|---|---|---|
| CN | 1856614 A | 1/2006 |
| JP | 6-192938 | 7/1994 |

(Continued)

OTHER PUBLICATIONS

English-language International Search Report from the Japanese Patent Office, dated Feb. 18, 2014, for International Application No. PCT/JP2013/083761.

(Continued)

*Primary Examiner* — Arti Singh-Pandey
(74) *Attorney, Agent, or Firm* — Finnegan, Henderson, Farabow, Garrett & Dunner, LLP

(57) ABSTRACT

The purpose of the present invention is to provide a fabric for an air bag that, during high-pressure deployment at high speed, maintains low air permeability as an air bag and is capable of maintaining the low air permeability even after exposure to heat. This fabric for an air bag comprises a synthetic fiber and is characterized by the contact angle of a circumscribed circle at intersecting sections in which the warp thread and the weft thread come in contact in the cross section of the fabric is at least 80° in both the warp thread direction and the weft thread direction.

12 Claims, 2 Drawing Sheets

(51) Int. Cl.
  *D06C 15/00* (2006.01)
  *D03D 15/00* (2006.01)
  *D03D 1/02* (2006.01)
  *D06C 15/08* (2006.01)

(52) U.S. Cl.
  CPC ......... *D03D 15/0077* (2013.01); *D03D 47/32* (2013.01); *D06C 15/00* (2013.01); *D06C 15/08* (2013.01); *B60R 2021/23509* (2013.01)

(58) Field of Classification Search
  CPC .... F15D 1/0022; F15D 1/0278; F15D 1/0297; B60R 2021/23509; B60R 21/235; D06C 15/00; D06C 15/08
  See application file for complete search history.

(56) References Cited

U.S. PATENT DOCUMENTS

| | | |
|---|---|---|
| 6,182,709 B1 | 2/2001 | Konishi et al. |
| 2005/0170723 A1 | 8/2005 | Okada |
| 2011/0020628 A1 | 1/2011 | Fukudome et al. |
| 2012/0089299 A1* | 4/2012 | Breed .................... B60C 11/24 701/36 |

FOREIGN PATENT DOCUMENTS

| | | |
|---|---|---|
| JP | 5-195419 | 8/1994 |
| JP | 2002-146646 | 5/2002 |
| JP | 2010-111958 | 5/2010 |
| JP | 2011-58118 | 3/2011 |
| JP | 2011-58137 | 3/2011 |
| JP | 2012-158850 | 8/2012 |
| WO | WO 93/05985 | 4/1993 |
| WO | WO 2009/119302 | 10/2009 |

OTHER PUBLICATIONS

International Preliminary Report on Patentability and Written Opinion of the International Searching Authority issued by the International Bureau of WIPO in International Application No. PCT/JP2013/083761, dated Jul. 2, 2015 (9 pages).

* cited by examiner a Entangled portions
b Non-entangled portion

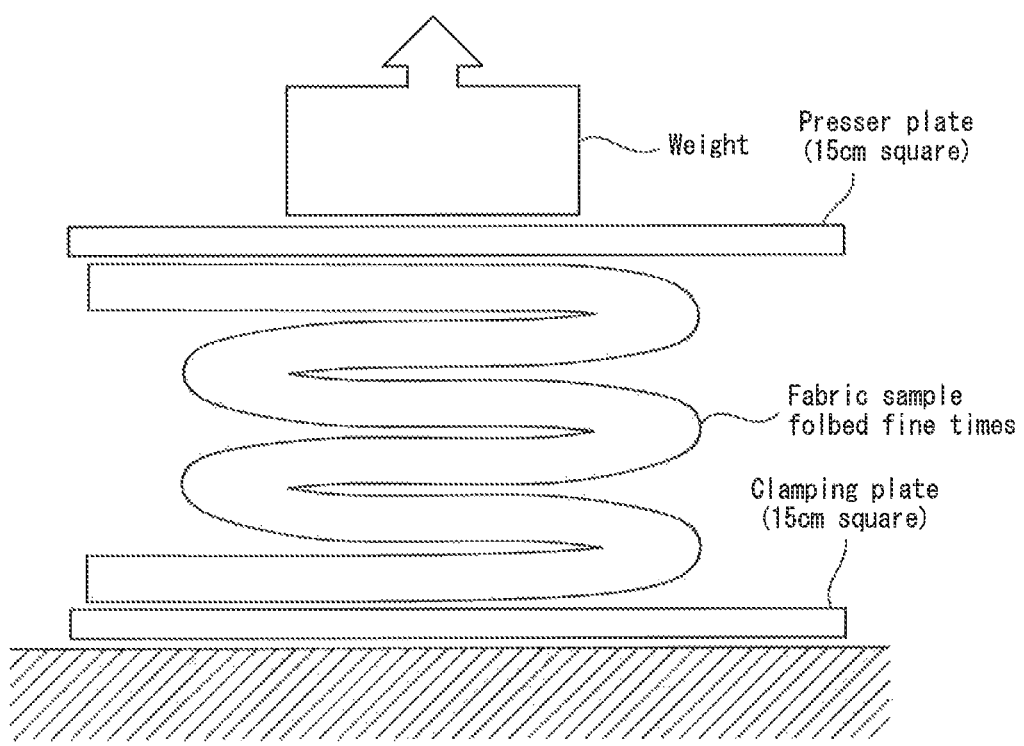

FABRIC FOR AN AIR BAG THAT MAINTAINS AIR PERMEABILITY DURING HIGH-PRESSURE DEPLOYMENT AT HIGH SPEED

TECHNICAL FIELD

The present invention relates to an air bag used as the bag-shape article of an air bag functioning as a passenger protective device during a motor vehicle collision, and more particularly, to a fabric for an air bag for obtaining an air bag that deploys at high speed and is resistant to high pressure.

BACKGROUND ART

Air bags are being increasingly installed in motor vehicles for the purpose of reducing the impact on the human-body during a collision accident involving an automobile or other motor vehicle. Air bags absorb and reduce the impact on the human-body by being inflated by a gas at the time of a collision, and in addition to air bags for the driver's seat and passenger's seat, air bags such as curtain air bags, side air bags, knee air bags and rear air bags are being installed and used practically throughout vehicles to ensure passenger protection. Moreover, air bags have also been proposed that are installed so as to inflate outside the passenger compartment in order to protect pedestrians.

Air bags such as curtain air bags, which are deployed and inflated from the ceiling above the doors to protect the head and neck regions of passengers during a side collision, or side impact air bags, which are deployed and inflated from the car seats to protect the chest and pelvis of passengers, are required to cushion the body by being deployed at high speed due to the short distance between the vehicle sidewall and the occupant's body. In addition, since air bags for protecting pedestrians cover a large area, they are also required to prepare for a collision by being deployed at high speed.

These air bags are folded up and stored in a compact form during ordinary vehicle operation. When a collision has been detected by a sensor and the air bag deploys and inflates, the air bag flies out by breaking through its storage compartment, such as the fitting of a ceiling trim cover or the stitched portion of a passenger seat, while being unfolded by gas generated with an inflator to cushion the human-body when it has been sufficiently inflated.

In the case of air bags that are required to deploy at higher speeds, it is necessary to enhance the pressure resistance of the bag-shape article in order to obtain an air bag that offers a higher level of safety. Therefore, the need has arisen to suppress air permeability under high-pressure conditions to a greater extent than in the past. Moreover, it is also necessary to suppress high-pressure air permeability even after exposure to heat in order to maintain performance over a long period of time.

Although a method involving providing a resin coating on a fabric has been used to suppress air permeability, a lightweight fabric free of a resin coating is advantageous for high-speed deployment.

For example, Patent Document 1 indicated below discloses a textile for an air bag in which air permeability at a pressure difference of 500 Pa is 120 L/dm$^2$·min or less even after aging cycle treatment, consisting of subjecting to a high temperature of 105° C. for 100 hours followed by subjecting to a low temperature and high humidity, and the change in air permeability after aging cycle treatment is 15% or less, and discloses as the production method of that textile a process consisting of subjecting to shrinkage treatment in hot water at 60° C. to 140° C. and drying in a tender at a temperature of 150° C. or lower followed by cooling slowly and winding at low tension.

Patent Document 2 indicated below discloses a textile in which air permeability at a pressure difference of 500 Pa or less is 120 L/dm$^2$·min or less even after high-temperature treatment at 120° C. for 400 hours by using a textile processing step consisting of multistage heated drying following hot water shrinkage. In addition, Patent Document 3 indicated below discloses a textile in which air permeability at a pressure difference of 19.6 kPa is 0.50 L/cm$^2$/min or less even after high-temperature treatment at 120° C. for 400 hours by subjecting a textile, which uses a multifilament yarn having a filament fineness of 1 dtex to 2 dtex, to high-temperature setting, with the rate of change before and after treatment being 150% or less. However, air permeability under even higher pressure conditions during air bag deployment and high-pressure air permeability following exposure to heat are not disclosed. In addition, high-pressure air permeability after an air bag has been exposed to heat after having been folded up and housed in a compact compartment is also not disclosed.

PRIOR ART DOCUMENTS

Patent Documents

Patent Document 1: Japanese Unexamined Patent Publication No. H05-195419
Patent Document 2: Japanese Unexamined Patent Publication No. 2002-146646
Patent Document 3: Japanese Unexamined Patent Publication No. 2010-111958

SUMMARY OF THE INVENTION

Problems to be Solved by the Invention

An object of the present invention is to provide a fabric for an air bag that maintains air permeability as an air bag during high-pressure deployment at high speed and is capable of maintaining low air permeability even after exposure to heat, and an air bag that uses that fabric.

Means for Solving the Problems

As a result of conducting extensive studies, the inventor of the present invention found that, by employing a fabric structure containing a large contact area where the warp and weft threads that compose the fabric mutually come in contact, air permeability under high pressure is suppressed and high-pressure air permeability after exposure to heat is also suppressed, thereby leading to completion of the present invention.

Namely, the present invention provides a fabric for an air bag as described below.

(1) A fabric for an air bag composed of synthetic fibers, wherein the contact angle of a circumscribed circle at intersecting sections where the warp thread and weft thread come in contact in a cross-section of the fabric is 80° or more in both the warp thread direction and the weft thread direction.

(2) The fabric for an air bag described in 1 above, wherein the radius of an circumscribed circle at the intersecting sections where the warp thread and the weft thread come in contact is 400 µm or less in both the warp thread direction and the weft thread direction.

(3) The fabric for an air bag described in 1 or 2 above, wherein the synthetic fibers are composed of synthetic filaments having a substantially round cross-section.

(4) The fabric for an air bag described in any of 1 to 3 above, wherein the fabric is a plain weave fabric.

(5) The fabric for an air bag described in any of 1 to 4 above, wherein the fineness of the synthetic fibers composing the fabric is 300 dtex to 720 dtex.

(6) The fabric for an air bag described in 5 above, wherein the fineness of the synthetic fibers composing the fabric is 380 dtex to 550 dtex, and the filament fineness thereof is greater than 2 dtex but less than 8 dtex.

(7) The fabric for an air bag described in any of 1 to 6 above, wherein an increase in air permeability after exposing the fabric to heat treatment at 140° C. for 100 hours is six-fold or less.

(8) The fabric for an air bag described in any of 1 to 7 above, wherein the fabric contains 0.03% by weight to 0.3% by weight of a cyclohexane-extracted oil component.

(9) The fabric for an air bag described in any of 1 to 8 above, wherein dimensional stability of the fabric at 120° C. is within ±4%.

(10) The fabric for an air bag described in any of 1 to 9 above, wherein the fabric is imprinted with a bar code.

(11) The fabric for an air bag described in any of 1 to 10 above, wherein the number of entanglements of the synthetic fibers is 5 counts/m to 30 counts/m.

(12) An air bag that uses the fabric for an air bag described in any of 1 to 11 above.

(13) The air bag described in 12 above, which does not have a resin coating.

(14) A method for producing a fabric for an air bag composed of synthetic fibers, comprising: 1) weaving with high tension warp threads in a water jet loom, 2) carrying out a washing treatment step at 80° C. or lower or not carrying out a washing step, 3) drying at a temperature of 120° C. or lower, and 4) carrying out calendering processing.

Effects of the Invention

Since the fabric of the present invention is a fabric that has low air permeability under high pressure and low air permeability under high pressure even after exposure to heat, an air bag can be provided that is lightweight and demonstrates superior high-speed deployment in an air bag requiring high-pressure deployment. Moreover, an air bag can be provided on which inkjet printing for marking a product is readily legible.

BRIEF DESCRIPTION OF THE DRAWINGS

FIG. 3 is a drawing showing a device for forming folds in a fabric.

EMBODIMENTS FOR CARRYING OUT THE INVENTION

The following provides a detailed explanation of the present invention.

Figure 1:
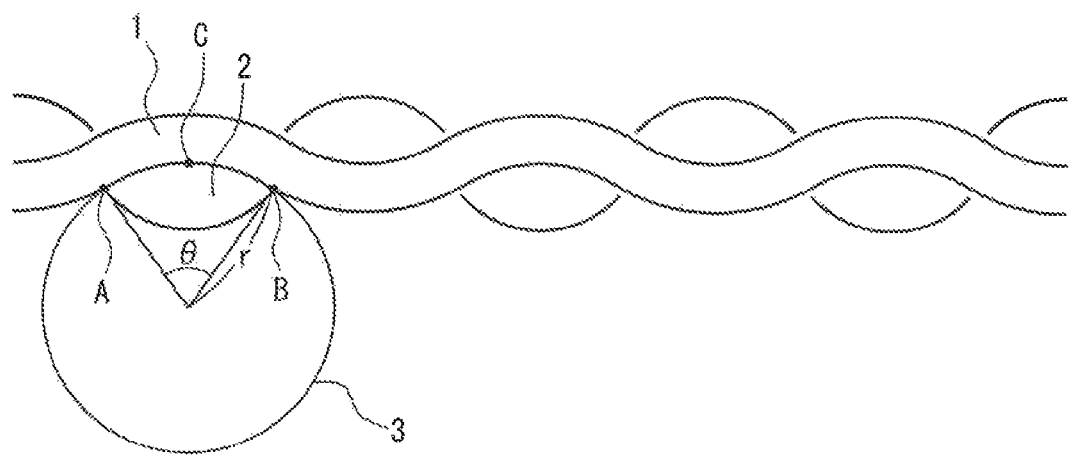
FIG. 1 is a drawing showing the curved shape of threads in a cross-section of the fabric of the present invention for explaining the radius of curvature of a circumscribed circle and contact angle.

Although the warp threads and weft threads that compose the fabric are curved and come in mutual contact, when the fabric is cut along the center line of the threads, a cross-section in the lengthwise direction of the curved weft threads and a horizontal cross-section of the warp threads, or a cross-section in the lengthwise direction of the curved warp threads and a horizontal cross-section of the weft threads, come in contact, and cross-sections can be observed in which mutually intersecting sections of the warp threads and the weft threads in the form of contact line segments reach a maximum length. FIG. 1 is a drawing of a cross-sectional view taken along the center line of a warp thread, reference numeral 1 in the drawing indicates a cross-section of a carved warp thread in the lengthwise direction, and reference numeral 2 indicates a horizontal cross-section of a weft thread intersecting with the warp thread. The mutual intersecting section of the warp thread and weft thread in the form of a contact line segment is represented by arc ACB in the drawing, A and B represent both ends of the contact line segment, and C represents the central portion of the contact line segment. In the present invention, a circumscribed circle 3 was determined that is composed of these three points consisting of both ends and the central portion of the contact line segment, the intersecting section was taken to be a contact arc, and a central angle θ of the contact arc ACB in the circumscribed circle 3 was taken to be the contact angle of the intersecting section where the warp thread and weft thread come in contact.

As the contact angle increases, a shape results in which the warp thread and weft thread bite into each other. As weaving density increases, although the threads begin to form a tight engaged form and the contact angle temporarily increases, if weaving density increases further and cover factor increases to about 2000 or more, even though low-load static air permeability decreases, the fibers become packed together and shift towards the outside from the central plane of the fabric causing a decrease in contact angle. However, it was found that by making the contact angle to be 80° C. or more, air permeability is suppressed even if the fabric is momentarily exposed to high pressure of 100 kPa and subjected to dynamic tensile deformation. Moreover, thread morphology of the fabric is maintained and air permeability is suppressed even after subjecting to heat treatment for 100 hours at 140° C. so as to accelerate thermal deformation of the synthetic fibers. In addition, increases in air permeability attributable to yarn shifts in the woven texture at folds where the fabric has been folded are suppressed, and increases in air permeability are suppressed even after heat treatment. On the other hand, the contact angle is preferably 150° or less from the viewpoint of fabric flexibility. Moreover, the contact angle is preferably 120° or less from the viewpoint of tear strength and other mechanical properties.

In addition, the contact angle of intersecting sections is preferably substantially equal on the front and back of the fabric. The ratio of the contact angle between the front and back of the fabric is preferably greater than 0.95 but less than 1.05.

In the present invention, the radius of curvature of the intersecting sections where the warp threads and the weft threads come in contact refers to the radius of curvature r of the circumscribed circle 3 in the aforementioned contact arc of the threads in a cross-section of the fabric as shown in FIG. 1. The radius of curvature of the intersecting sections is preferably 200 μm to 400 μm. If the radius of curvature of the intersecting sections is 400 μm or less, mutual contact between the fibers increases and the contact angle is large. The radius of curvature of the intersecting sections is more preferably 380 μm or less. If the radius of curvature of the intersecting sections is 200 μm or more, the contact angle becomes excessively large and there is increased susceptibility to the occurrence of problems with mechanical properties.

In addition, the radius of curvature of the intersecting sections is preferably substantially equal on the front and back of the fabric. The ratio between the radius of curvature of the intersecting sections on the front and back of the fabric is preferably greater than 0.95 but less than 1.05.

In the fabric for an air bag of the present invention, the synthetic fibers that compose the fabric are fibers composed of a thermoplastic resin, and can be selected from among polyamide fibers or polyester fibers and the like.

Examples of polyamide fibers that compose the fabric include polyamide 6, polyamide 6•6, polyamide 11, polyamide 12, polyamide 6•10, polyamide 6•12, polyamide 4•6, copolymers thereof and fibers composed of mixed resins thereof. In particular, polyamide 6•6 fibers are preferably fibers composed mainly of polyhexamethylene adipamide. Although polyhexamethylene adipamide refers to polyamide resin composed of 100% hexamethylenediamine and adipic acid that has a melting point of 250° C. or higher, fibers composed of polyamide 6•6 used in the present invention may also be fibers composed of resin obtained by copolymerizing or blending polyamide 6, polyamide 6•I, polyamide 6•10 or polyamide 6•T and the like with polyhexamethylene adipamide within a range over which the melting point of the resin does fall below 250° C.

Examples of polyester fibers include fibers composed of resin obtained by polycondensation of a carboxylic acid and/or a derivative thereof with a diol using a known method, resin composed of a hydroxycarboxylic acid and resin obtained by copolymerization or blending thereof. Examples of the carboxylic acid component that composes the polyester fibers include aromatic dicarboxylic acids such as terephthalic acid, isophthalic acid or 2,6-naphthalene dicarboxylic acid, aliphatic dicarboxylic acids such as oxalic acid, succinic acid, maleic acid or fumaric acid, and alicyclic dicarboxylic acids such as 1,4-cyclohexane dicarboxylic acid. Examples of diols include aliphatic diols such as ethylene glycol, 1,2-propylene glycol, 1,3-propylene glycol, 1,3-butanediol, trimethylene glycol or diethylene glycol, and diphenols such as hydroquinone, resorcinol or bisphenol A. Examples of hydroxycarboxylic acids include aromatic hydroxycarboxylic acids such as p-hydroxybenzoic acid. Specific examples of polyester fibers include polyethylene terephthalate fibers, polybutylene terephthalate fibers, polytrimethylene terephthalate fibers, polycyclohexylene dimethylene terephthalate fibers, polyethylene naphthalate fibers, polybutylene naphthalate fibers, polyethylene isophthalate-terephthalate copolymer fibers, polybutylene isophthalate-terephthalate copolymer fibers, polycyclohexylene dimethylene and isophthalate-terephthalate copolymer fibers. From the viewpoints of strength and heat resistance, polyethylene terephthalate fibers, polybutylene terephthalate fibers, polytrimethylene terephthalate fibers, polycyclohexylene dimethylene terephthalate fibers and polyethylene naphthalate fibers are preferable, and polyethylene terephthalate fibers, polybutylene terephthalate fibers, polytrimethylene terephthalate fibers and polyethylene naphthalate fibers are more preferable. Polyethylene terephthalate fibers are particularly preferable, and polyethylene terephthalate fibers containing 90 mol % or more, and preferably 95 mol % or more, of ethylene terephthalate repeating units in the molecular chain thereof are preferable from the viewpoints of strength and heat resistance. The polyethylene terephthalate fibers may contain other copolymer components at a ratio of less than 10 mol % and preferably less than 5 mol %. Examples of such copolymer components include isophthalic acid, 2,6-naphthalene dicarboxylic acid, 2,5-naphthalene dicarboxylic acid, 2,7-naphthalene dicarboxylic acid, 1,5-naphthalene dicarboxylic acid, adipic acid, p-oxybenzoic acid, diethylene glycol, propylene glycol, 1,4-butylene glycol, trimellitic acid and pentaerythritol.

Furthermore, the synthetic fibers used in the fabric of the present invention may contain various types of additives routinely used to improve productivity or properties in the production and processing processes of bulk yarn. Examples of additives that can be contained include heat stabilizers, antioxidants, light stabilizers, lubricants, antistatic agents, plasticizers and flame retardants.

The amount of fluff due to filament breakage of the synthetic fibers used in the fabric of the present invention is preferably 100 or less per $10^8$ m so as to enable high-density weaving without gluing during warping.

The synthetic fibers used in the fabric of the present invention are preferably substantially not twisted. Substantially not twisted means that fibers are used in which twists have intentionally not been carried out, and that the number of twists is not observed to exceed unwinding twisting of less than 10/m, which occurs when removing the bulk yarn from the package. The use of untwisted synthetic fibers makes it easy to control the morphology in which the warp threads and weft threads bite into each other during high-density weaving on a loom.

In addition, the synthetic fibers used in the fabric of the present invention are multifilaments and the number of air entanglements is preferably 5 counts/m to 30 counts/m. If the number of air entanglements is 5 counts/m or more, high-density weaving is possible without using sizing-agent. On the other hand, if the number of entanglements is 30 counts/m or less, entanglements are suitably removed and the warp threads and the weft threads favorably engaged together when woven, thereby contributing to a reduction in the contact angle of intersecting sections of the warp threads and the weft threads with the circumscribed circle in a cross-section of the weave. In addition, the engaged form of the threads following heat treatment is also favorably maintained, thereby contributing to maintaining suppression of air permeability after heat treatment. The number of air entanglements of the synthetic fibers is more preferably 10 counts/m to 25 counts/m.

In addition, boiling water shrinkage of the synthetic fibers used in the fabric of the present invention is preferably 3.0% to 12.0%. If the boiling water shrinkage of the synthetic fibers used in the fabric is 3.0% or more, the engaged form of the warp threads and the weft threads of the fabric can be heat-set by utilizing the contractile force of the synthetic fibers, thereby contributing to maintaining suppression of air permeability after heat treatment. If the boiling water shrinkage is 12.0% or less, a heat processing step can be carried out stably. The boiling water shrinkage of the synthetic fibers is more preferably 3.5% to 10.5% and even more preferably 6.5% to 10.0%.

The fineness of the synthetic fibers that compose the fabric is preferably 300 dtex to 720 dtex and more preferably 380 dtex to 550 dtex. In addition, the synthetic fibers that compose the fabric are multifilament fibers composed of a large number of filaments, and the fineness of the filaments is preferably greater than 2 dtex but less than 8 dtex. More preferably, filament fineness is greater than 2.5 dtex but less than 4.5 dtex. Filament fineness of less than 8 dtex results in a larger contact angle and makes it easier for the threads to adopt a engaged form. In addition, filament fineness of less than 8 dtex results in favorable liquid retention during inkjet printing and increases resistance to bleeding, thereby making inkjet printing more legible. On the other hand, filament fineness in excess of 2 dtex eliminates susceptibility to filament damage during processing and does not impair the mechanical properties of the fabric. In addition, the surface morphology of the fabric, namely fabric smoothness, is easily maintained during handing following calendaring and other finishing processing. The filaments preferably have a substantially round cross-section. Dynamic high-pressure air permeability of a fabric becomes difficult to suppress as the cross-sectional shape of filaments becomes increasingly flat. A substantially round cross-section means that the cross-section has a round shape without being flat or modified, and the aspect ratio of a cross-section, which is the ratio of the length of the long axis to the length of the short axis, is preferably from 1.0 to 1.2. In addition, the cross-sectional form of a filament is preferably solid. If the cross-sectional form of a filament is hollow, the filament cross-section is crushed during high-density weaving causing it to have a substantially flat shape and making it difficult to suppress dynamic high-pressure air permeability of the fabric. Calendering processing is preferably carried out on both sides.

The cover factor of the fabric is preferably 2000 to 2600. Cover factor CF is determined by the calculation indicated below.

$$CF=(\sqrt{\text{warp thread fineness(dtex)}})\times\text{warp thread density(count/2.54 cm)}+(\sqrt{\text{weft thread fineness(dtex)}})\times\text{weft thread density(count/2.54 cm)}$$

Here, the warp thread fineness and weft thread fineness respectively refer to the fineness of the synthetic fibers that compose the fabric.

Cover factor is the degree to which fibers fill a plane, and static air permeability is suppressed if that value is 2000 or more. Problems in the weaving process can be avoided if the cover factor is 2600 or less.

The weave of the fabric is preferably a plain weave basically composed of same yarn for both the warp threads and the weft threads. A plain weave may be obtained by weaving with two mat weaves for both the warp and weft in order to obtain a high-density plain weave.

Dynamic high-pressure air permeability is determined by measuring air permeability by momentarily changing the pressure applied to a sample by momentarily opening the valve of a high-pressure gas tank, and refers to air permeability at a pressure of 100 kPa as determined using the FX3350 manufactured by Textest Inc. in compliance with ASTM D6476. Dynamic high-pressure air permeability is preferably 1200 mm/s or less, and preferably as little air as possible is detected.

In addition, dynamic high-pressure air permeability of the fabric after heating in a hot air oven for 100 hours at 140° C. is preferably 1500 mm/s or less and more preferably 1200 mm/s or less, and air permeability is preferably as low as possible and more preferably not detected. In terms of the ratio of air permeability before and after heat treatment, obtained by comparing air permeability after treatment with air permeability before heat treatment, air permeability after heat treatment is 1 to 6 times greater, more preferably 4.5 times or less, even more preferably 4 times or less, and still more preferably 3 times or less, than air permeability prior to heat treatment.

Moreover, with respect to air permeability of the folded fabric, the increase in dynamic high-pressure air permeability after treating in a hot air oven for 400 hours at 140° C. is preferably 1000 mm/s or less and more preferably 500 mm/s or less.

In the fabric for an air bag of the present invention, the content of an oil component extracted with cyclohexane is preferably from 0.03% by weight to 0.3%, more preferably 0.03% by weight to 0.2% by weight, and even more preferably 0.05% by weight to 0.15% by weight based on the weight of the base cloth. If the content of the cyclohexane-extracted oil component is 0.03% by weight or more, the friction of the surface of the woven fibers decreases and decreases in tear strength of the fabric can be prevented. Thus, bursting resistance of the air bag can be enhanced. In addition, the effect of retaining liquid droplets between filaments contributes to increased legibility of inkjet-printed characters. On the other hand, the loss of composite threads can be prevented by making the content of the cyclohexane-extracted oil to be 0.03% by weight or less, thereby making it possible to avoid escape of gas used to deploy the air bag and rupturing of the air bag caused by the concentrated passage of hot gas. In order to make the content of the extracted oil component to be 0.03% by weight to 0.3% by weight, an oil component can be imparted to the cloth by de-oiling spinning oil components originating in the thread production process or warping oil components in the thread warping process in a water jet loom process used to produce the fabric, or by suitably selecting conditions of the scouring process following weaving. Preferably, the spinning oil component and warping oil component are reduced to a suitable oil component content by running water in a water jet weaving process, and in such cases, a separate scouring process may be omitted.

In the fabric of the present invention, shrinkage in the warp direction and weft direction of the cloth after allowing to stand for 30 minutes at 120° C. serves as an indicator of dimensional stability, and is preferably within ±4%, more preferably within ±2% and even more preferably within ±1%. The fabric of the present invention has a polymer structure that is heat-set.

Boiling water shrinkage of the threads that compose the fabric of the present invention is preferably −3.5% to 4.0% and more preferably −2.5% to 3.5%. Boiling water shrinkage of fibers composing the fabric of 4.0% or lower contributes to dimensional stability after heating. On the other hand, the fabric is normally in a contracted state in which the boiling water shrinkage of threads composing the fabric demonstrates a value of −3.5% or higher.

The single tongue tear strength of the fabric of the present invention is preferably 120 N or more. Tear strength of 120 N or more enables the air bag to be used under general-purpose loads. Moreover, tear strength of 150 N or more enables the air bag to withstand bursting during high-pressure deployment.

The threads composed of synthetic fibers are sent to the warping process preferably without gluing, and after going through beam warping, are rewound onto the warping beam for use as warp thread. In addition, a portion is provided for use as weft thread followed by weaving.

It is important that the threads form a curved engaged state on the loom to increase the contact angle. A curved state in which the threads are adequately engaged together is formed by first setting the warp tension to a somewhat high level to create effective beating conditions. The warp tension is preferably 0.20 cN/dtex to 0.65 cN/dtex. The contact angle increases at a warp tension of 0.20 cN/dtex or higher. On the other hand, weaving problems such as warp thread breakage can be avoided by making the warp tension 0.65 cN/dtex or lower, and more preferably 0.25 cN/dtex to 0.55 cN/dtex. Warp tension can be adjusted by measuring warp tension between the warping beam and back roller (tensioning roller). The curved state of the woven threads formed during weaving is to be maintained in subsequent steps so as not to lower the contact angle. A water jet loom, air jet loom or rapier loom can be used for the loom. Among these, the use of a water jet loom is preferable since the amount of adhered oil can be controlled to a low level without using a subsequent scouring process.

In the scouring process, caution is required since the curved state of the adequately engaged threads formed in the weaving process has a tendency to be disrupted due to the contractive action of the synthetic fibers in hot water. A scouring method is to be used in which scouring is carried out at a temperature of preferably at 80° C. or lower, and more preferably 60° C. or lower, while the fabric spread out wide without causing rubbing or other stimulation. The scouring process is most preferably completely omitted.

Caution is also required in the drying process so that the adequately engaged state of the fibers formed in the weaving process is not disrupted. It is also necessary to avoid excessive occurrence of contraction of the synthetic fibers. Drying treatment is preferably carried out at 110° C. or lower and more preferably at 80° C. or lower.

Next, in the case of the so-called heat setting process, since there is a tendency for the curved state of the adequately engaged threads to end up being disrupted in comparison with hot calendering processing if pressure that restricts the fabric in the direction of thickness is not allowed to act thereon, heat setting treatment is not carried out or is only limited to low-temperature heat setting treatment preferably at a temperature of 140° C. or lower and more preferably 120° C. or lower.

A woven structure, in which the contact angle of intersecting sections of the warp threads and weft threads is large while the adequately engaged threads are in a curved state formed in the weaving process, is strengthened and fixed by heat and pressure. In other words, the structure is preferably finished by a heat treatment process capable of fixing the structure as a thermally stable structure.

Namely, the fabric is preferably finished in a calendering process. Calendering processing is preferably carried out without going through heat setting treatment or by limiting to low-temperature heat setting treatment preferably at a temperature of 140° C. or lower and more preferably 120° C. or lower. The amount of strain remaining in the fiber polymer structure can be used to fix the polymer structure by hot calendering so that hardly any hot water shrinkage occurs due to a previous process such as the scouring process. Although the heating temperature of the calender rollers can be determined by combining with applying pressure at a temperature equal to or higher than the vicinity of the softening temperature of the fiber material, a temperature of 40° C. to 250° C. can be suitably selected. The heating temperature is preferably 120° C. or higher in order to fix the polymer structure of the fibers composing the fabric. On the other hand, the heating temperature is preferably 220° C. or lower so that there is no obvious deformation of filament cross-sections of the composite fibers resulting in a significant decrease in tear strength or other mechanical properties. More preferably, the heating temperature is 150° C. to 200° C. The processing pressure in terms of linear pressure is preferably 100 N/cm to 300 N/cm. A processing pressure of 100 N/cm or more contributes to a structure having a large contact angle of intersecting sections of the fiber threads, while a processing pressure of 3000 N/cm or less makes it possible to prevent filament cross-sections of the composite fibers from deforming, thereby causing a significant decrease in tear strength and other mechanical properties. More preferably, the processing pressure is 3000 N/cm to 1500 N/cm. Although able to be suitably selected, processing speed is preferably 1 m/min to 30 m/min. If processing speed is 1 m/min or more, the effects of heat in the absence of compressive action before and after rolling, namely relaxation of the structure of the fabric threads resulting in a decrease in the contact angle of intersecting sections, is easily prevented. On the other hand, if the processing speed is 30 m/min or less, adequate hot compression effects are easily obtained, and uniform processing, which makes it possible to avoid quality abnormalities such as bending, is realized easily. In addition, hot calendering processing may be repeated several times. In the case of a process in which heating rollers are only located on one side of the fabric, hot calendering processing is preferably successively carried out on the front and back sides of the fabric, respectively. The surface of the calender rollers is preferably flat and the roughness thereof can be suitably selected. Roughness is suitably modified within a range such that the surface of the rollers does not become remarkably glossy in the manner of a mirrored surface. In addition, the material of the rollers can be suitably selected from among materials such as metal, ceramics, paper, elastomer or plastic, and rollers combining these materials may also be used. In calendering processing, since effects thereof are influenced by the moisture content of the fabric, the fabric moisture content is to be suitably controlled. Moreover, calender finishing also contributes to improved legibility of printed characters during inkjet printing in order to print a marking on the fabric for the purpose of product identification by smoothing the fabric surface.

The fabric of the present invention is suitable for use in an air bag by being cut and sewn as is without subjecting to resin finishing. On the other hand, the fabric of the present invention may also be used as a base fabric for an air bag by coating with a resin or elastomer.

A sewn air bag composed of the fabric of the present invention can also be used as an air bag module or air bag unit by incorporating therein.

EXAMPLES

Although the following provides an explanation of the present invention according to examples and reference examples thereof, the present invention is not limited to only these examples. First, an explanation is provided of measurement methods and evaluation methods used in the present description.

Figure 2:
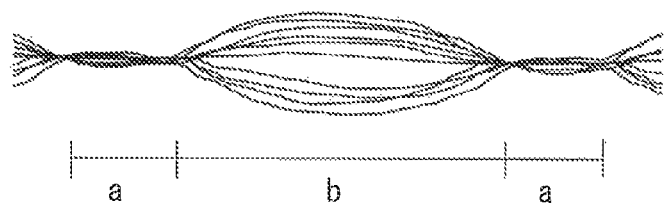
FIG. 2 is a drawing showing a state in which synthetic fibers have been floated in a water bath for measuring entanglement.

(1) Number of Synthetic Fiber Entanglements (count/m):
The number of synthetic fiber entanglements was determined by floating the synthetic fibers on the surface of water and observing the status of the filament bundles using a water bath for measuring entanglement. The water bath was of a size measuring 1.0 m long, 20 cm wide and 15 cm high (water depth), and water supplied from a supply port was drained from the water bath by overflow. Namely, water inside the measurement bath was replenished by constantly supply fresh water at a flow rate of about 500 cc/min. The number of entangled portions a of the filament bundles that spread out on the water surface was counted by employing this water immersion method as shown in FIG. 2. This measurement was repeated ten times followed by determination of the average value thereof.

(2) Boiling Water Shrinkage (%): Boiling water shrinkage of the synthetic fibers was carried out in accordance with the method of 8.18.1a) of JIS L1013:2010 followed by determination of the average value of five measurements. Boiling water shrinkage of the threads (threads composing the weave) was determined in accordance with the method of 8.18.1b) of JIS L1013:2010 followed by determination of the average value of five measurements. At that time, length was measured for composite fibers that unraveled from the weave according to Appendix G and GA of JIS 1096.

(3) Fabric Sample Preparation: The fabric was used in each measurement and evaluation after adjusting to the standard state of JIS L0105:2006.

(4) Weaving Density (ends/2.54 cm): Weaving density was measured according to Appendix FA of Method 8.6.1b) B of JIS L1096:2010.

(5) Synthetic Fiber Fineness (dtex): Fineness was measured according to Appendix H (Method B) of method 8.9.1.1a)2)B of JIS L1096:2010.

(6) Contact Angle (degrees) and Radius of Curvature (μm): A cross-section in the warp direction and a cross-section in the weft direction were cut out of the fabric along the center line of the threads followed by taking electron micrographs of the cross-sections at a magnification 35×. As shown in FIG. 1, the circumscribed circle 3 was drawn from three points consisting of points A and B at both ends of the section where the warp and weft threads intersect and the center point C followed by determination of the central angle θ of arc ACB of the intersecting section along with the radius of curvature r of the circumscribed circle. The circumscribed circle 3 was respectively drawn at 10 random points on the upper surface and lower surface of the fabric sample and the central angle θ and radius r were determined followed by determining the average values thereof.

(7) Tear strength (N): Tear strength was measured according to Method 8.17.1A-1 of JIS L1096:2010.

(8) High-Pressure Air Permeability (mm/s): Air permeability was determined when pressure rose to 100 kPa by measuring dynamic air permeability with the FX3350 manufactured by Textest Inc. in compliance with ASTM D6476.

(9) Evaluation after Heat Exposure: The fabric was spread out and suspended in an air oven at 140° C., and after allowing to stand exposed for 100 hours, the fabric was returned to the standard state and subjected to each evaluation.

(10) Post-Heat Treatment Air Permeability: After going through the heat exposure of item (9) above, high-pressure air permeability (mm/s) was determined according to item (8) above. High-pressure air permeability after heat treatment was divided by high-pressure air permeability before heat treatment to obtain post-heat treatment air permeability ratio.

(11) Post-Heat Treatment Increase in Fold Air Permeability (mm/s): A fabric sample measuring 15 cm on a side was folded five times in the manner of bellows having a width of about 2.54 cm as shown in FIG. 3, and after placing between aluminum plates measuring 15 cm on a side, placing a 1 kg weight thereon and allowing to stand for 12 hours, high-pressure air permeability was measured at the center fold in the same manner as the high-pressure air permeability (mm/s) of item (8). After exposing the same folded fabric sample with the same weight placed thereon to heat in the same manner as item (9), the weight was removed and the fabric was spread out in the standard state followed by measurement of high-pressure air permeability at the center fold in the same manner as the high-pressure air permeability (mm/s) of item (8). High-pressure air permeability before heat treatment was subtracted from high-pressure air permeability after heat treatment to obtain the increase in fold air permeability following heat treatment (mm/s).

(12) Cyclohexane-Extracted Oil Component: A fabric sample was extracted with cyclohexane using a Soxhlet extractor. The amount of oily agent component (wt %) in the sample was determined from the weight of the cyclohexane-extracted fraction after drying to a solid.

(13) Dimensional stability (%): After drawing reference lines at a fixed interval on the fabric, the fabric was placed in an air oven at 120° C. and allowed to stand for 30 minutes followed by measuring the distance between the reference lines while in the standard state and averaging the change in distance for warp and weft.

(14) Inkjet Printing: A bar code having a width of 10 mm was printed on the fabric using ethanol-based blank ink with an inkjet printer equipped with a 60 micron nozzle at a fabric feed rate of 20 m/min. The printed surface was observed with a 35× magnifying glass and the printed bars of the bar code were evaluated for bleeding, and printing in which the borders of the bars were well-defined and free of bleeding was evaluated with a A, printing in which the borders of the bars were well-defined but bleeding was observed was evaluated with a B, and printing in which the borders of the bars contained portions that were indistinct was evaluated with an C.

Example 1

Polyhexamethylene adipamide was melt and spun followed by hot drawing, and the resulting fibers having tenacity of 8 cN/dtex were used as weaving threads. The fibers contained 50 ppm of copper and 1500 ppm of iodine added during resin polymerization. These fibers demonstrated fineness of 470 dtex, filament count of 136 and boiling water shrinkage of 7.0%, and the number of air entanglements as determined according to the water immersion method was 10 counts/m. These fibers were uniformly arranged without twisting and without sizing to comprise a warping beam for use as warp threads, and then wound without twisting or gluing and supplied directly from the package. Warp thread tension was then set on the loom with a water jet loom to obtain a plain woven fabric at 400 picks per minute. The resulting woven fabric was dried at 60° C. without scouring to reduce the fabric moisture content to 3%. Next, the fabric was treated by hot calender processing at a feed rate of 18 m/min, metal roller temperature of 160° C. and pressure of 490 N/cm, followed by finishing by treating the opposite side under the same conditions. The calender rollers that sandwiched the fabric from above and below consisted of a upper metal roller for heating having a diameter of 12 cm and a lower roller having a paper surface and a diameter of 24 cm, and the surface speeds were the same for the upper and lower rollers. The paper roller surface had a Shore D hardness of 65. The weaving density of the finished fabric was 51.0 ends/2.54 cm for both the warp and weft. The production conditions and evaluation results of this fabric are shown in Table 1.

The morphology of the fabric exhibited a large contact angle and the woven threads adequately bit into each other. High-pressure air permeability as well as air permeability after heating were suppressed. Dimensional stability and inkjet printability were favorable.

Example 2

A fabric was obtained in the same manner as Example 1 after having adjusted the reed density to align the warp conditions followed by adjusting the weft beating conditions to obtain a fabric in which the weaving density of the finished fabric was 53.0 ends/2.54 cm. The production conditions and evaluation results of the fabric are shown in Table 1.

Example 3

A fabric was obtained in the same manner as Example 1 after having adjusted the reed density to align the warp conditions followed by adjusting the weft beating conditions to obtain a fabric in which the weaving density of the finished fabric was 54.5 ends/2.54 cm. The production conditions and evaluation results of the fabric are shown in Table 1.

Example 4

A fabric was obtained in the same manner as Example 1 after having adjusted the reed density to align the warp conditions followed by adjusting the weft beating conditions to obtain a fabric in which the weaving density of the finished fabric was 49.0 ends/2.54 cm. The production conditions and evaluation results of the fabric are shown in Table 1.

Example 5

Example 5 was carried out in the same manner as Example 2 with the exception of making the metal roller temperature for heating 180° C., the pressure 2000 N/cm and the feed rate 8 m/min in hot calendering processing. The production conditions and evaluation results of the fabric are shown in Table 1.

Example 6

Example 6 was carried out in the same manner as Example 2 with the exception of scouring with a hot water bath at 60° C. after weaving before transferring the fabric to the drying step. The production conditions and evaluation results of the fabric are shown in Table 1.

Example 7

Polyethylenetelephthalate fibers were used for the weaving thread that had a fineness of 550 dtex, filament count of 144, boiling water shrinkage of 7.0%, 10 entanglements/m. The fibers were plain woven with a water jet loom followed by drying at 60° C. without scouring to reduce the moisture content to 0.8%. Next, the fabric was treated by hot calendering processing under conditions of a feed rate of 18 m/min, metal roller temperature of 180° C. and pressure of 490 N/cm, followed by finishing by treating the opposite side by hot calendering processing under the same conditions. The weaving density of the finished fabric was 49.0 ends/2.54 cm for both the warp and weft. The production conditions and evaluation results of this fabric are shown in Table 1.

Example 8

Example 8 was carried out in the same manner as Example 1 using weaving thread having 25 air entanglements/m to obtain a fabric in which the weaving density of the finished fabric was 51.0 ends/2.54 cm. The production conditions and evaluation results of the fabric are shown in Table 1.

Comparative Example 1

A plain woven fabric was obtained with a water jet loom in the same manner as Example 1. The resulting woven fabric was finished by drying at 60° C. without scouring. After adjusting the reed density during weaving and adjusting the weft beating conditions, the weaving density of the finished fabric was 51.0 ends/2.54 cm for both the warp and weft. The production conditions and evaluation results of the fabric are shown in Table 1. Although the weaving density of the fabric is the same as Example 1 for both the warp and weft, since hot calendering processing was not carried out, the contact angle increased and high-pressure air permeability was high. Dimensional stability was poor and the legibility of inkjet printing was also poor.

Comparative Example 2

A plain woven fabric was obtained with a water jet loom in the same manner as Example 1. The resulting woven fabric was finished by drying at 60° C. without scouring. After adjusting the reed density during weaving to align the warp conditions and adjusting the weft beating conditions, the weaving density of the finished fabric was 53.0 ends/2.54 cm for both the warp and weft. The production conditions and evaluation results of the fabric are shown in Table 1. Although the weaving density of the fabric is the same as Example 2 for both the warp and weft, since hot calendering processing was not carried out, the contact angle increased and high-pressure air permeability was high. Dimensional stability was poor and the legibility of inkjet printing was also poor.

Comparative Example 3

A plain woven fabric was obtained with a water jet loom in the same manner as Example 1. The resulting woven fabric was finished by drying at 60° C. without scouring. After adjusting the reed density during weaving to align the warp conditions and adjusting the weft beating conditions, the weaving density of the finished fabric was 54.5 ends/2.54 cm for both the warp and weft. The production conditions and evaluation results of the fabric are shown in Table 1. Although the weaving density of the fabric is the same as Example 3 for both the warp and weft, since hot calendering processing was not carried out, the contact angle increased and high-pressure air permeability was high. Dimensional stability was also poor and the legibility of inkjet printing was somewhat poor.

Comparative Example 4

A plain woven fabric was obtained with a water jet loom in the same manner as Example 1. The resulting woven fabric was finished by drying at 120° C. without scouring followed by finished with a tender at 180° C. while driving the reed carriage at an overfeed rate of 1% to maintain the same width. After adjusting the reed density during weaving to align the warp conditions and then adjusting the weft beating conditions, the weaving density of the finished fabric was 53.0 ends/2.54 cm for both the warp and weft. The production conditions and evaluation results of the fabric are shown in Table 1. Since the fabric was finished by tender setting and the contact angle was not large, high-pressure air permeability after heating was high. In addition, the increase in air permeability of the folds after heating was large. Although dimensional stability was favorable, legibility of inkjet printing was somewhat poor.

Comparative Example 5

A plain woven fabric was obtained with a water jet loom in the same manner as Example 1. The resulting woven fabric was scoured with hot water at 90° C., dried at 120° C. and then finished with a tender at 180° C. while driving the reed carriage at an overfeed rate of 1% to maintain the same width. After adjusting the reed density during weaving to align the warp conditions and then adjusting the weft beating conditions, the weaving density of the finished fabric was 53.0 ends/2.54 cm for both the warp and weft. The production conditions and evaluation results of the fabric are shown in Table 1. Since the fabric was finished by tenter setting after going through scouring and the contact angle was not large, high-pressure air permeability after heating was high. Although dimensional stability was favorable, legibility of inkjet printing was somewhat poor.

Comparative Example 6

A plain woven fabric was obtained with a water jet loom in the same manner as Example 1 with the exception of making the warp tension 0.18 N/dtex. The resulting woven fabric was scoured with hot water at 90° C., dried at 120° C. and then treated with hot calendering processing in the same manner as Example 1 under conditions of a feed rate of 18 m/min, metal roller temperature of 160° C. and pressure of 490 N/cm, followed by finishing by carrying out hot calendering treatment on the opposite side under the same conditions. After adjusting the reed density during weaving to align the warp conditions and then adjusting the weft beating conditions, the weaving density of the finished fabric was 53.0 ends/2.54 cm for both the warp and weft. The production conditions and evaluation results of the fabric are shown in Table 1. Since the fabric was finished by hot calendering after weaving at low tension and undergoing scouring resulting in a large contact angle, high-pressure air permeabiilty after heating was high. Dimensional stability and inkjet printing legibility were favorable.

Comparative Example 7

A plain woven fabric was obtained with a water jet loom in the same manner as Example 1 with the exception of making the warp tension 0.18 N/dtex. The resulting woven fabric was dried at 60° C. without scouring to reduce the fabric moisture content to 3%. Next, the fabric was treated in a hot calendering process under conditions of a feed rate of 18 m/min, metal roller temperature of 160° C. and pressure of 490 N/cm, followed by finishing by treating the opposite side under the same conditions. After adjusting the reed density during weaving to align the warp conditions and then adjusting the weft beating conditions, the weaving density of the finished fabric was 53.0 ends/2.54 cm for both the warp and weft. The production conditions and evaluation results of the fabric are shown in Table 1. Since the contact angle was not large even after hot calendering following low-tension weaving, high-pressure air permeability after heating was high. Dimensional stability and inkjet printing legibility were favorable.

Comparative Example 8

A plain woven fabric was obtained with a water jet loom in the same manner as Example 1. The resulting woven fabric was scoured with hot water at 90° C., dried at 120° C. and then treated in a hot calendering process in the same manner as Example 1 under conditions of a feed rate of 18 m/min, metal roller temperature of 160° C. and pressure of 490 N/cm, followed by finishing by treating the opposite side under the same conditions. After adjusting the reed density during weaving to align the warp conditions and then adjusting the weft beating conditions, the weaving density of the finished fabric was 54.5 ends/2.54 cm for both the warp and weft. The production conditions and evaluation results of the fabric are shown in Table 1. Dimensional stability and inkjet printing legibility were both favorable. Since the fabric was subjected to hot calendering finishing after going through a shrinkage process by scouring, thereby preventing the contact angle from becoming large as well as the engaged structure of the threads from being fixed, high-pressure air permeability after heating ended up increasing. In addition, the increase in air permeability of the folds after heating was considerably large.

Comparative Example 9

A fabric in which the weaving density of the finished fabric was 51.0 ends/2.54 cm was obtained in the same manner as Example 1 using weaving thread in which the number of air entanglements was 34 counts/m. The production conditions and evaluation results of the fabric are shown in Table 1. Since the contact angle was not large, both high-pressure air permeability and high-pressure air permeability after heating were high. It was also difficult to make the surface smooth and inkjet printing legibility was poor.

TABLE 1

| | | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|---|---|---|---|---|---|---|
| Contact Angle | Degrees | | | | | | | | | | | | | | | | | |
| Warp | | 91 | 86 | 83 | 106 | 125 | 83 | 91 | 88 | 76 | 72.5 | 69 | 66 | 59 | 72.5 | 72.5 | 69 | 79 |
| Weft | | 89 | 84 | 81 | 104 | 125 | 81 | 89 | 86 | 74 | 70.5 | 67 | 64 | 57 | 70.5 | 70.5 | 67 | 77 |
| Avg. | | 90 | 85 | 82 | 105 | 125 | 82 | 90 | 87 | 75 | 71.5 | 68 | 65 | 58 | 71.5 | 71.5 | 68 | 78 |
| Radius of Curvature | μm | | | | | | | | | | | | | | | | | |
| weft | | 335 | 335 | 363 | 228 | 225 | 363 | 335 | 340 | 390 | 400 | 405 | 423 | 445 | 400 | 400 | 405 | 383 |
| Warp | | 375 | 395 | 410 | 318 | 225 | 410 | 375 | 384 | 435 | 455 | 470 | 480 | 513 | 455 | 455 | 470 | 433 |
| Avg. | | 355 | 375 | 386.5 | 303 | 225 | 386.5 | 355 | 362 | 412.5 | 427.5 | 437.5 | 451.5 | 479 | 427.5 | 427.5 | 437.5 | 408 |
| Cyclohexane-extract oil component | % | 0.15 | 0.15 | 0.15 | 0.15 | 0.15 | 0.04 | 0.15 | 0.15 | 0.15 | 0.15 | 0.15 | 0.15 | 0.02 | 0.02 | 0.15 | 0.02 | 0.15 |
| Bulk yarn | | 7 | 7 | 7 | 7 | 7 | 7 | 7 | 7 | 7 | 7 | 7 | 7 | 7 | 7 | 7 | 7 | 7 |
| Boiling water Shrinkage | % | | | | | | | | | | | | | | | | | |
| Entangle | count/m | 10 | 10 | 10 | 10 | 10 | 10 | 10 | 25 | 10 | 10 | 10 | 10 | 10 | 10 | 10 | 10 | 34 |
| Weaving Warp tension | cN/dtex | 0.40 | 0.40 | 0.40 | 0.40 | 0.40 | 0.40 | 0.40 | 0.40 | 0.40 | 0.40 | 0.40 | 0.40 | 0.18 | 0.18 | 0.18 | 0.40 | 0.40 |
| Scouring (water temp) | | No | No | No | No | No | (50° C.) | No | No | No | No | No | No | (90° C.) | (91° C.) | No | (90° C.) | No |
| Finishing Calendering | | Cal | Cal | Cal | Cal | Cal | Cal | Cal | Cal | None | None | None | None | Tenterset | Cal | Cal | Cal | Cal |
| Temp. | °C. | 160 | 160 | 160 | 160 | 180 | 160 | 180 | 160 | — | — | — | 180 | 180 | 160 | 160 | 160 | 160 |
| Speed | m/min | 18 | 18 | 18 | 18 | 8 | 18 | 18 | 18 | — | — | — | 18 | 18 | 18 | 18 | 18 | 18 |
| Press | N/cm | 490 | 490 | 490 | 490 | 2000 | 490 | 490 | 490 | — | — | — | — | — | 490 | 490 | 490 | 490 |
| Tear strength | N | | | | | | | | | | | | | | | | | |
| Weft | | 180 | 170 | 165 | 185 | 105 | 180 | 120 | 180 | 185 | 180 | 175 | 185 | 185 | 175 | 180 | 155 | 200 |
| Warp | | 185 | 180 | 180 | 190 | 110 | 185 | 130 | 185 | 190 | 185 | 180 | 190 | 190 | 180 | 185 | 160 | 200 |
| Weaving density | ends/2.54 cm | | | | | | | | | | | | | | | | | |
| Warp | | 51.0 | 53.0 | 54.5 | 49.0 | 53.0 | 53.0 | 53.0 | 51.0 | 51.0 | 53.0 | 54.5 | 53.0 | 53.0 | 53.0 | 53.0 | 54.5 | 51.0 |
| Weft | | 51.0 | 53.0 | 54.5 | 49.0 | 53.0 | 53.0 | 49.5 | 51.0 | 51.0 | 53.0 | 54.5 | 53.0 | 53.0 | 53.0 | 53.0 | 54.5 | 51.0 |
| Avg. | | 51.0 | 53.0 | 54.5 | 49.0 | 53.0 | 53.0 | 51.3 | 51.0 | 51.0 | 53.0 | 54.5 | 53.0 | 53.0 | 53.0 | 53.0 | 54.5 | 51.0 |
| Cover factor | | 2211 | 2298 | 2363 | 2125 | 2298 | 2298 | 2404 | 2211 | 2211 | 2298 | 2363 | 2298 | 2298 | 2298 | 2298 | 2363 | 2211 |
| Air perm. | mm/s | 510 | 230 | 130 | 1000 | 130 | 260 | 500 | 650 | 1400 | 510 | 230 | 770 | 640 | 360 | 510 | 230 | 1250 |
| High-pressure air perm. | mm/s | 890 | 640 | 510 | 1180 | 140 | 760 | 760 | 1200 | 2800 | 1900 | 1500 | 1400 | 2050 | 1500 | 1650 | 1530 | 3500 |
| Post-heat. high-pressure Air perm. | | | | | | | | | | | | | | | | | | |
| Post-heat. Air perm. Ratio | | 1.7 | 2.8 | 3.9 | 1.2 | 1.1 | 2.9 | 1.5 | 1.8 | 2.0 | 3.7 | 6.5 | 1.8 | 3.2 | 3.9 | 3.2 | 6.7 | 2.8 |
| Post-head fold air perm. Increase | mm/s | 320 | 360 | 400 | 260 | 40 | 440 | 200 | 480 | 1680 | 2100 | 2430 | 1020 | 3020 | 1800 | 1530 | 3090 | 3150 |
| Dimensional Stability 120° C., 30 min | % | 0.7 | 0.7 | 0.7 | 0.7 | 0.7 | 0.7 | 0.25 | 0.7 | 3 | 3 | 3 | 0.5 | 0.5 | 0.5 | 1.5 | 0.5 | 0.7 |
| Inkjet print Legibility | | A | A | A | A | A | A | A | A | C | C | B | B | B | A | A | A | B |

As is clear from Table 1, the fabric of the present invention has extremely superior high-pressure air permeability and inkjet printing legibility.

INDUSTRIAL APPLICABILITY

Since the fabric of the present invention is a fabric that has low air permeability under high pressure as well as low air permeability under high pressure even after exposure to heat without having a resin coating, it is preferable for use as a fabric for an air bag requiring high-pressure deployment at high speed.

BRIEF DESCRIPTION OF THE REFERENCE SYMBOLS 1 cross-section along warp fiber direction
2 cross-section of weft fiber
3 Circumscribed circle
A One end of contact line segment
B One end of contact line segment
C Central portion of contact line segment
θ Contact angle of intersecting section
r Radium of curvature of intersecting section

The invention claimed is:

1. A fabric for an air bag composed of synthetic fibers, wherein the contact angle of a circumscribed circle at intersecting sections where the warp thread and weft thread come in contact in a cross-section of the fabric is 80° or more in both the warp thread direction and the weft thread direction, wherein the radius of an circumscribed circle at the intersecting sections where the warp thread and the weft thread come in contact is 380 μm or less in both the warp thread direction and the weft thread direction, and wherein the tear strength of the fabric according to Method 8.17.1A-1 of JIS1096:2010 is 120 N or more.

2. The fabric for an air bag according to claim 1, wherein the synthetic fibers are composed of synthetic filaments having a substantially round cross-section.

3. The fabric for an air bag according to claim 1, wherein the fabric is a plain weave fabric.

4. The fabric for an air bag according to claim 1, wherein the fineness of the synthetic fibers composing the fabric is 300 dtex to 720 dtex.

5. The fabric for an air bag according to claim 4, wherein the fineness of the synthetic fibers composing the fabric is 380 dtex to 550 dtex, and the filament fineness thereof is greater than 2 dtex but less than 8 dtex.

6. The fabric for an air bag according to claim 1, wherein an increase in air permeability after exposing the fabric to heat treatment at 140° C. for 100 hours is six-fold or less.

7. The fabric for an air bag according to claim 1, wherein the fabric contains an oil component from 0.03% by weight to 0.3% by weight when it is extracted with cyclohexane.

8. The fabric for an air bag according to claim 1, wherein dimensional stability of the fabric at 120° C. is within ±4%.

9. The fabric for an air bag according to claims 1, wherein the fabric is imprinted with a bar code.

10. The fabric for an air bag according to claim 1, wherein the number of entanglements of the synthetic fibers is 5 counts/m to 30 counts/m.

11. An air bag that uses the fabric for an air bag according to any of claim 1.

12. The air bag according to claim 11, which does not have a resin coating.

* * * * *